(12) United States Patent
Bramley et al.

(10) Patent No.: US 11,720,472 B2
(45) Date of Patent: *Aug. 8, 2023

(54) LIVENESS AS A FACTOR TO EVALUATE MEMORY VULNERABILITY TO SOFT ERRORS

(71) Applicant: NVIDIA Corporation, Santa Clara, CA (US)

(72) Inventors: Richard Gavin Bramley, Santa Clara, CA (US); Philip Payman Shirvani, Santa Clara, CA (US); Nirmal R. Saxena, Los Altos Hills, CA (US)

(73) Assignee: NVIDIA Corporation, Santa Clara, CA (US)

( * ) Notice: Subject to any disclaimer, the term of this patent is extended or adjusted under 35 U.S.C. 154(b) by 100 days.

This patent is subject to a terminal disclaimer.

(21) Appl. No.: 17/522,417

(22) Filed: Nov. 9, 2021

(65) Prior Publication Data

US 2022/0114075 A1 Apr. 14, 2022

Related U.S. Application Data

(60) Continuation of application No. 16/849,697, filed on Apr. 15, 2020, now Pat. No. 11,188,442, which is a (Continued)

(51) Int. Cl.
*G06F 11/00* (2006.01)
*G06F 11/34* (2006.01)
(Continued)

(52) U.S. Cl.
CPC ........ *G06F 11/3471* (2013.01); *G06F 11/073* (2013.01); *G06F 11/0757* (2013.01);
(Continued)

(58) Field of Classification Search
CPC .. G06F 11/3471; G06F 11/076; G06F 11/073; G06F 11/0757; G06F 11/1068;
(Continued)

(56) References Cited

U.S. PATENT DOCUMENTS 6,434,628 B1 8/2002 Bowman-Amuah
6,954,916 B2 10/2005 Bernstein et al.
(Continued)

OTHER PUBLICATIONS

International Search Report and Written Opinion from International Application No. PCT/US2018/048627, dated Nov. 2, 2018.

*Primary Examiner* — Esaw T Abraham
(74) *Attorney, Agent, or Firm* — Leydig, Voit & Mayer, Ltd.

(57) ABSTRACT

Memory, used by a computer to store data, is generally prone to faults, including permanent faults (i.e. relating to a lifetime of the memory hardware), and also transient faults (i.e. relating to some external cause) which are otherwise known as soft errors. Since soft errors can change the state of the data in the memory and thus cause errors in applications reading and processing the data, there is a desire to characterize the degree of vulnerability of the memory to soft errors. In particular, once the vulnerability for a particular memory to soft errors has been characterized, cost/reliability trade-offs can be determined, or soft error detection mechanisms (e.g. parity) may be selectively employed for the memory. In some cases, memory faults can be diagnosed by redundant execution and a diagnostic coverage may be determined.

20 Claims, 11 Drawing Sheets

Related U.S. Application Data division of application No. 16/115,189, filed on Aug. 28, 2018, now Pat. No. 10,691,572.

(60) Provisional application No. 62/552,282, filed on Aug. 30, 2017.

(51) Int. Cl.
*G06F 11/10* (2006.01)
*G06F 11/07* (2006.01)

(52) U.S. Cl.
CPC ...... G06F 11/1068 (2013.01); G06F 11/3419 (2013.01); G06F 11/3457 (2013.01); G06F 11/3476 (2013.01); *G06F 2201/81* (2013.01); *G06F 2201/88* (2013.01)

(58) Field of Classification Search
CPC ............. G06F 11/3457; G06F 11/3476; G06F 11/3419; G06F 2201/81; G06F 2201/88
See application file for complete search history.

(56) References Cited

U.S. PATENT DOCUMENTS

| | | | |
|---|---|---|---|
| 6,971,051 B2 | 11/2005 | Taylor et al. | |
| 7,331,043 B2 | 2/2008 | Saulsbury | |
| 7,558,992 B2 * | 7/2009 | Ergin | G06F 11/1008 |
| | | | 714/719 |
| 7,830,386 B1 | 11/2010 | Hahn | |
| 7,923,756 B2 | 4/2011 | Fukui | |
| 8,090,996 B2 * | 1/2012 | Vera | G06F 11/1497 |
| | | | 714/17 |
| 8,091,050 B2 * | 1/2012 | Bose | G06F 30/367 |
| | | | 716/136 |
| 8,407,653 B1 * | 3/2013 | Schumacher | G06F 30/33 |
| | | | 716/132 |
| 8,423,975 B1 | 4/2013 | Scallon | |
| 8,706,921 B2 | 4/2014 | Zadigian et al. | |
| 8,890,083 B2 | 11/2014 | Paone et al. | |
| 8,949,101 B2 * | 2/2015 | Bose | G01R 31/31816 |
| | | | 716/136 |
| 9,026,688 B2 | 5/2015 | Stroud | |
| 9,075,735 B2 | 7/2015 | Tomlinson et al. | |
| 9,075,904 B2 * | 7/2015 | Casado | G06F 11/3471 |
| 9,292,418 B2 * | 3/2016 | Sridharan | G06F 11/3471 |
| 9,378,148 B2 * | 6/2016 | Novakovsky | G06F 12/0804 |
| 9,384,091 B2 * | 7/2016 | Orion | G06F 11/1064 |
| 9,601,217 B1 | 3/2017 | Karakozova | |
| 9,639,418 B2 | 5/2017 | Bowman et al. | |
| 10,365,327 B2 | 7/2019 | Bose et al. | |
| 10,684,902 B2 | 6/2020 | Sridharan et al. | |
| 10,997,027 B2 | 5/2021 | Didehban et al. | |
| 2002/0162069 A1 | 10/2002 | Laurent | |
| 2007/0079185 A1 * | 4/2007 | Totolos | G06F 11/106 |
| | | | 714/718 |
| 2007/0162798 A1 | 7/2007 | Das et al. | |
| 2012/0254847 A1 | 10/2012 | George et al. | |
| 2013/0061104 A1 | 3/2013 | Hari | |
| 2013/0132056 A1 | 5/2013 | Toba et al. | |
| 2013/0227220 A1 | 8/2013 | Xi et al. | |
| 2013/0275810 A1 | 10/2013 | Yigzaw et al. | |
| 2014/0189252 A1 | 7/2014 | Biswas | |
| 2014/0281740 A1 | 9/2014 | Casado et al. | |
| 2014/0304456 A1 | 10/2014 | Narsimha et al. | |
| 2014/0304477 A1 | 10/2014 | Hughes et al. | |
| 2014/0344643 A1 * | 11/2014 | Hughes, Jr. | G06F 11/1008 |
| | | | 714/763 |
| 2015/0234967 A1 | 8/2015 | Mazzawi et al. | |

* cited by examiner

LIVENESS AS A FACTOR TO EVALUATE MEMORY VULNERABILITY TO SOFT ERRORS

CLAIM OF PRIORITY

This application is a continuation of U.S. application Ser. No. 16/849,697 (now U.S. Pat. No. 11,188,442, issued Nov. 30, 2021) titled "DETERMINING DIAGNOSTIC COVERAGE FOR MEMORY USING REDUNDANT EXECUTION," filed Apr. 15, 2020 that is a divisional application of U.S. application Ser. No. 16/115,189 (now U.S. Pat. No. 10,691,572, issued Jul. 23, 2020) titled "LIVENESS AS A FACTOR TO EVALUATE MEMORY VULNERABILITY TO SOFT ERRORS," filed Aug. 28, 2018, that claims the benefit of U.S. Provisional Application No. 62/552,282 titled "SYSTEMS AND PLATFORMS USING LIVENESS FACTOR FOR APPROXIMATING AVF," filed Aug. 30, 2017, the entire contents of these applications are incorporated herein by reference.

STATEMENT REGARDING FEDERALLY SPONSORED RESEARCH AND DEVELOPMENT

This invention was made with US Government support under LLNS subcontract B620719 awarded by DOE. The US Government has certain rights in this invention.

FIELD OF THE INVENTION

The present invention relates to the vulnerability of memory to soft errors, and more particularly to factors that characterize the vulnerability of memory to soft errors.

BACKGROUND

Memory, used by a computer to store data, is generally prone to faults, including permanent faults (i.e. relating to a lifetime of the memory hardware), and also transient faults (i.e. relating to some external cause) which are otherwise known as soft errors. Since soft errors can change the state of the data in the memory and thus cause errors in applications reading and processing the data, there is a desire to characterize the degree of vulnerability of the memory to soft errors. In particular, once the vulnerability for a particular memory to soft errors has been characterized, cost/reliability trade-offs can be determined, or soft error detection mechanisms (e.g. parity) may be selectively employed for the memory.

The architectural vulnerability factor (AVF) is a previously recognized parameter for characterizing the vulnerability of the memory to soft errors. Specifically, it refers to a probability that a fault in a particular memory will result in an error. The AVF can be used as the basis for making cost/reliability trade-offs or for determining when to employ soft error detection mechanisms, and it has been particularly useful in the realm of functional safety analysis.

To date, AVF has been estimated using fault injection, where individual faults are simulated across specific memory models. This technique requires countless passes to simulate every possible fault over every model of the different memory structures. Thus, fault injection in a large design with many memories (typically 1000s in large GPUs) is impractical since it would generally take years of compute/simulation time. More information on existing techniques for computing the AVF are disclosed in "Computing Architectural Vulnerability Factors for Address-Based Structures," by Arijit Biswas, Paul Racunas, Razvan Cheveresan, Joel Emer, Shubhendu S. Mukherjee and Ram Rangan (32nd International Symposium on Computer Architecture (ISCA '05), 4-8 Jun. 2005); and "A Systematic Methodology to Compute the Architectural Vulnerability Factors for a High-Performance Microprocessor," by Shubhendu S. Mukherjee, Christopher Weaver, Joel Emer, 1 Steven K. Reinhardt, and Todd Austin, (Proceedings of the 36th Annual International Symposium on Microarchitecture (MICRO), December 2003).

There is a need for addressing these issues and/or other issues associated with the prior art.

SUMMARY

A method, computer readable medium, and system are disclosed for using liveness as a factor to evaluate memory vulnerability to soft errors. In one embodiment, a counter is set for each entry of a plurality of entries in a memory. Additionally, a simulation is executed for the memory over a preconfigured window of time. During the simulation, each of the counters is manipulated to record each residency period for the corresponding entry. The residency period is defined by: a first time that the corresponding entry is written with data, and a second time of a last read of the data from the corresponding entry. Further, after completion of the simulation, the counters are processed to determine a first liveness factor for the memory, where the first liveness factor represents a vulnerability of the memory to soft errors.

In another embodiment, a first instance of execution occurring in a first window of time is simulated, including a computation that performs write operations and read operations across a plurality of entries of the memory. Additionally, in succession with the first instance of the execution, a second instance of the execution for the memory is simulated over a second window of time. During the second instance of the execution, for each entry of the plurality of entries of the memory, an initial access made to the entry is logged, where the initial access is one of a write operation or a read operation. Further, for each entry of the plurality of entries where the initial access made to the entry is the write operation, the entry is selected to form a subset from the plurality of entries. A diagnostic coverage for the execution is indicated as a ratio of a number of entries in the subset to a total number of entries in the plurality of entries.

DETAILED DESCRIPTION

Evaluating Memory Vulnerability to Soft Errors

Figure 1A:
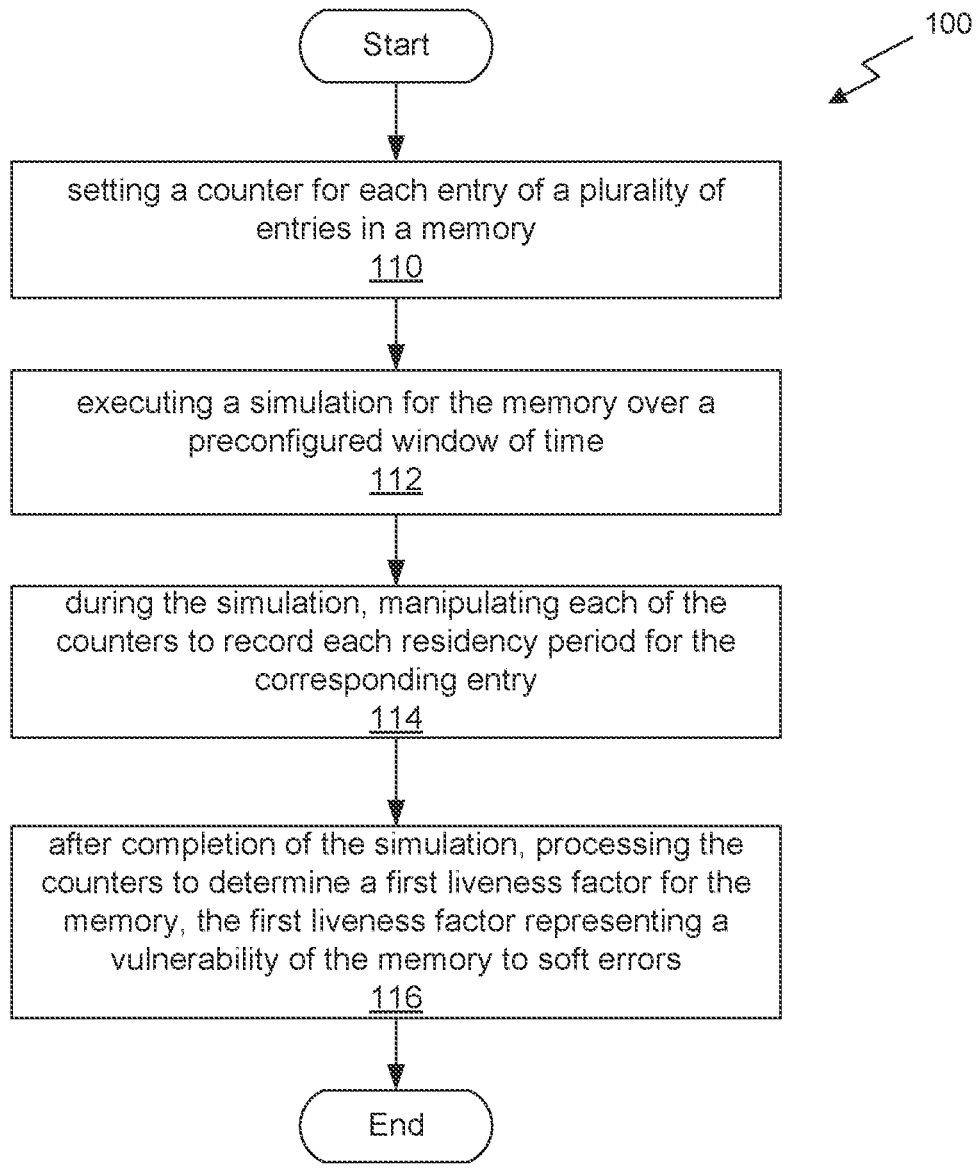
FIG. 1A illustrates a flowchart of a method for using liveness as a factor to evaluate memory vulnerability to soft errors, in accordance with an embodiment.

FIG. 1A illustrates a flowchart of a method 100 for using liveness as a factor to evaluate memory vulnerability to soft errors (e.g. the AVF of a particular memory), in accordance with an embodiment. It should be noted that the method 100 may be carried out by a processing unit, and may also be performed by a program, custom circuitry, or by a combination of custom circuitry and a program. For example, the method 100 may be executed by a GPU (graphics processing unit), CPU (central processing unit), or any processor capable of using liveness as a factor to evaluate memory vulnerability to soft errors. More specifically, the method 100 may be implemented, in some optional embodiments, using the parallel processing element (PPU) 300 of FIG. 3, by running the machine learning algorithm described below, and/or in the context of the any of the embodiments described below. Furthermore, persons of ordinary skill in the art will understand that any system that performs the method 100 is within the scope and spirit of embodiments of the present invention.

In the context of the present description, liveness refers to the percentage of time that a portion of memory has live data, or in other words data that has been written and that is subsequently read. Accordingly, liveness is a function of the time between the moment data is written to the time the data is last read as a proportion of the total safety relevant operating period. "Live" data, or data that has been written and that is subsequently read is vulnerable to errors, whereas "dead" data, or data that has been written and that is not subsequently read is not vulnerable. To this end, the liveness of a portion of data is used as a factor to evaluate the vulnerability of memory to soft errors.

As shown in operation 110, a counter is set for each entry of a plurality of entries in a memory. In one embodiment, each entry may be a different word in the memory, but in other embodiments each entry may be portions of the memory that are larger or smaller than a word. The memory may be random access memory (RAM), including any type of RAM. For example, the RAM may be made of static RAM (SRAM), flops, and/or latch arrays.

Each counter may be any data structure capable of recording the residency period(s) for its corresponding entry in the memory, as described in more detail below. Further, the counters may be stored in additional memory separate from the memory for which the counters are set. Setting the counters may include creating the counters in the additional memory, initializing the counters in the additional memory (e.g. to null or some other default value), or otherwise preparing each of the counters for use in recording the residency period(s) for its corresponding entry in the memory.

Additionally, in operation 112, a simulation is executed for the memory over a preconfigured window of time. The simulation may include executing an application that utilizes the memory, such as an application that performs one or more computations utilizing the memory. In another embodiment, the simulation may include executing a particular computation that utilizes the memory. In any case, the simulation utilizes the memory by writing to, and reading from, the memory. As an option, the simulation may be performed using a register-transfer level (RTL) description of the memory, or may be performed on the actual memory hardware.

In operation 114, during the simulation, each of the counters is manipulated to record each residency period for the corresponding entry. In the present description, the residency period is defined by: a first time that the corresponding entry is written with data, and a second time of a last read of the data from the corresponding entry. In particular, the residency period may be represented by a time period between the first time and the second time as they relate to a same instance of data, and therefore may indicate a time period during the simulation in which the entry has "live" data.

As noted above, the residency period is defined, in part, by a time that data is written to an entry in memory. As also noted above, the residency period is defined, in part, by a time that the data written to the entry is last read from the entry. The "last read" refers to the last occurrence, time-wise during the simulation, that the written data is read. Various processes can be used to identify each residency period for an entry in memory, such as monitoring write operations and read operations for the entry, and processing those operations to determine a residency period for each instance of data. The manipulation of the counters, when performed as described above, may follow these rules:

1) In a series of read operations during a residency period, only the time of the last read operation is recorded to define the residency period.

2) For an entry having two residency periods in succession, the time between the two residency periods is not recorded by the corresponding counter.

3) An entry which is written and never read does not have a residency period.

4) If the memory implements a bypass path, the read that uses the bypass path does not affect the liveness calculations, i.e., would not be marked as the last read (until the next read) because it does not read the array.

5) Partial writes are ignored (or are allowed which is indicated with the liveness output).

In one embodiment, the first time and the second time may be recorded as particular clock cycles within the preconfigured window of time, and in this case the residency period may be represented as a number of clock cycles from the first time to the second time. In another embodiment, global simulation time may be used as the reference for time stamps of the first time and the second time. Of course, other time keeping mechanisms may also be used. It should be noted that each entry is capable of having more than one residency period during the simulation. For example, an entry may have a first residency period, followed, some time after, by a second residency period. Accordingly, in operation 114, the counter is manipulated to record every residency period for the corresponding entry.

Further, in operation 116, after completion of the simulation, the counters are processed to determine a first liveness factor for the memory, where the first liveness factor represents a vulnerability of the memory to soft errors. As mentioned above, liveness refers to the percentage of time that a portion of memory has live data, or in other words data that has been written and that is subsequently read. In this context, the first liveness factor for the memory, and accordingly the vulnerability of the memory to soft errors, may be determined as a function of the residency periods recorded by the entries in the memory. In one embodiment, the liveness factor may represent an upper bound of the vulnerability of the memory to soft errors. As an option, memory models used for simulation can be augmented to compute the first liveness factor, which may allow the liveness factor to be computed over much longer application run times.

In one example, processing the counters to determine the first liveness factor for the memory may include: (1) calculating a sum of the residency periods for the plurality of entries, and (2) dividing the sum by a multiplication of: (a) a size of the memory and (b) the preconfigured window of time. Equation 1 below shows one mathematical equation that can be used to determine the first liveness factor for the memory, as described above.

$$\text{Liveness} = \frac{\sum_{t=0}^{T_{exe}} \sum_{i=0}^{W_{n-1}} |t_w(i) - t_{r\_last}(i)|}{R_{size} \times T_{exe}} \quad \text{Equation 1}$$

Where:

$t_w(i)$: time when $i_{th}$ word was written,
$t_{r\_last}(i)$: time of the last read of the $i_{th}$ word,
$R_{size}$: RAM size in words, and
$T_{exe}$: length in time of the execution window.

It should be noted that, when using RTL, the Verilog 'initial' block is assumed to be sufficient for resetting the instrumentation variables, since the time between activation of Verilog 'initial' block and de-assertion of reset is small enough relative to total RTL simulation time (assuming a reasonably sized workload) to not impact the liveness calculations. Additionally, when using RTL, the following functional features should be noted:

1) A RAM generator always generates and inserts the logging code inside `ifdef/` endif using enabling `defines. This ` define is enabled at compile time for RTL simulations that are done for AVF studies.

2) Dump of log data is via Verilog force to a specific signal name, per instance of memory; this is done sequentially by the user for all the target memories in the design so as not to mix the log data on the standard output.

Only behavioral models are required to have this code, not synthesis models.

Each memory instance will output, on demand using a Verilog force, the accumulated liveness so far, as calculated per formula described above, along with the instance name of the memory.

By manipulating the counters during the simulation and then processing the counters after completion of the simulation in order to determine the liveness factor for the memory, the vulnerability of the memory to soft errors may be determined from a single run of the simulation. This provides significant reduction in the consumption of computation resources and time spent that is otherwise required in the fault injection techniques employed in the prior art to determine vulnerability of the memory to soft errors. Furthermore, the above described process that uses liveness as a factor to evaluate the vulnerability of memory to soft errors may be utilized for numerous types of memory, and in particular numerous types of RAM memory, regardless of structure. This is a vast improvement to the fault injection techniques employed in the prior art which are structure specific, and thus must be configured on a structure by structure basis.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Figure 1B:
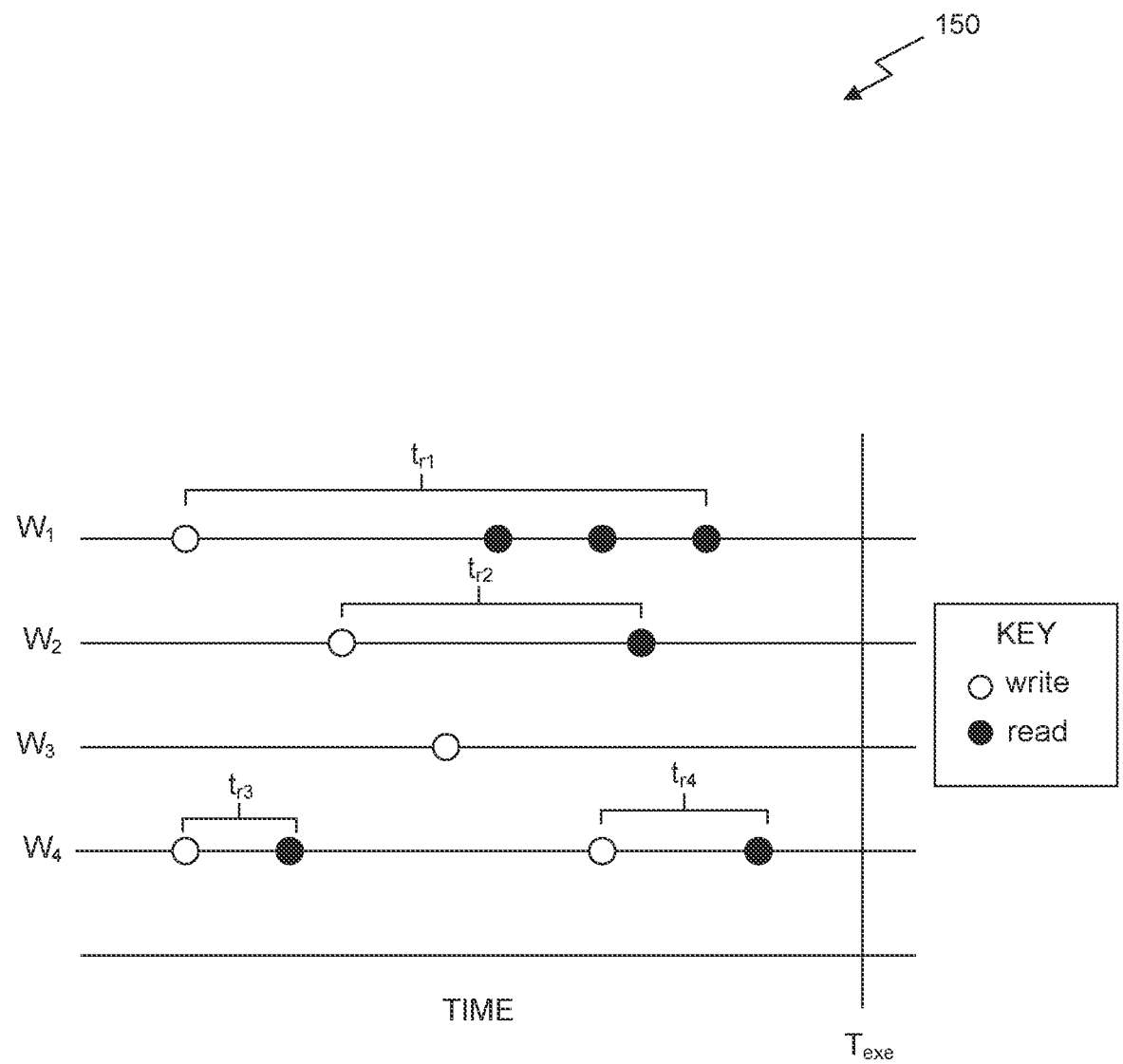
FIG. 1B illustrates a timing diagram for the simulation of FIG. 1A, in accordance with an embodiment.

FIG. 1B illustrates a timing diagram 150 for the simulation of FIG. 1A, in accordance with an embodiment. As shown, the memory includes four entries (words) $W_1$-$W_4$. A counter (not shown) is set for each of the entries.

During the simulation occurring over a window of time $T_{exe}$, data is written to, and read from, the entries as shown, and residency periods for the entries are recorded using the counters. For example, for $W_1$, the residency period $t_{r1}$ is recorded in the counter set for $W_1$. The residency period $t_{r1}$ is represented as a time period between the time data is written to the entry $W_1$ and the time that same data is last read from the entry $W_1$ during $T_{exe}$. For $W_2$, the residency period $t_{r2}$ is recorded in the counter set for $W_2$, and for $W_4$, the residency periods $t_{r3}$ and $t_{r4}$ are recorded in the counter set for $W_4$. As shown, $W_3$ does not have any residency period since the data written thereto is never subsequently read during $T_{exe}$.

Liveness for the memory in the present embodiment shown can be computed as $(t_{r1}+t_{r2}+t_{r3}+t_{r4})/4 \times T_{exe}$.

As described above with reference to the prior art, the determined vulnerability of the memory to soft errors may be utilized in various known ways, including as a basis for making cost/reliability trade-offs or for determining when to employ soft error detection mechanisms for the memory. In some specific use cases, the first liveness factor may be used as a proxy for the $F_{safe}$ parameter required in the Failure modes, effects, and diagnostic analysis (FMEDA) for memory structures.

One use of the liveness factor (for ascertaining the upper bound of the vulnerability of the memory to soft errors) is to evaluate the safety of a certain combination of memory components and software programs, including artificial intelligence (AI) programs, in various devices and systems. Such devices and systems include vehicles such as automobiles and airplanes, autonomous vehicles, remote controlled vehicles such as drones, security systems, robots, electronic equipment exposed to external elements or extreme conditions, and the like.

Based on the liveness factor, remedial actions can be taken to decrease the vulnerability of such devices and systems to soft errors. Such remedial actions include (1) substituting the memory component with another memory component that exhibits less vulnerability when used with the desired software program, (2) adding or increasing the shielding of the memory component, (3) redundantly executing all or portions of the desired software program and comparing the redundant executions to detect transient faults, and rolling back to a well-known, safe prior state upon fault detection, and (4) including redundant memory and comparing the states of the redundant memory to detect transient faults, and rolling back to a well-known, safe prior state upon fault detection.

Thus the liveness factor can be utilized to develop devices and systems that meet or exceed a desired safety level or an applicable industry safety standard. For example, the liveness factor can be used to evaluate and design memory and software programs that are suitable for inclusion in road vehicles and that satisfy, for example, ASIL D rating of the ISO 26262 standard.

For example, an automotive platform for autonomous or semi-autonomous vehicles may use a plurality of deep neural networks for a variety of functions, including but not limited to identifying lanes, objects, obstacles, and even occupants of the autonomous or semi-autonomous vehicle. The deep neural networks may be stored and operate using memory, and depending on their functions, may exhibit different liveness factors. Using the liveness factor, the system may be designed to ensure that all safety-critical functions have liveness factors less than the threshold value, thereby enhancing the overall vehicle safety and safety rating.

The liveness factor may vary depending on the mode of operation of the product. Thus, discrete liveness factors may be determined for distinct modes. An autonomous or semi-autonomous vehicle driving on the highway will have one set of liveness factors associated with the information stored in memory, while the same vehicle parked and idle may have another set of liveness factors. Similarly, an AI-powered robot may be idle for a given length of time, and when re-activated, need to access information stored in memory. Thus, a product may require different liveness factors for different modes. Information that may need to be reliably stored for an extended period during an idle (AI-robot) or park (autonomous vehicle) state will need greater protection from transient faults than information needed only during active operation.

In any case, by utilizing the liveness factor, new platforms can be designed and existing platforms can be improved to exhibit less vulnerability to transient faults. Such platforms can support a variety of systems, including various AI-related systems. For example, if the liveness factor indicates that a platform exhibits an undesired level of vulnerability to transient faults for safety-critical information stored in memory, the platform can be designed or improved to include additional protection mechanisms to reduce such vulnerability.

For example, a platform for autonomous and/or semi-autonomous vehicles may be provided, wherein the software and memory dedicated to safety-related functions has a liveness factor less than a given threshold necessary to meet the ASIL system safety metrics. That threshold may be determined using an additional or separate safety factor (S.F.) such that the system as a whole has a margin of safety that meets all industry, regulatory, and applicable safety standards.

In another embodiment, a platform for autonomous and/or semi-autonomous vehicles may be provided, wherein memory dedicated to safety-related functions having a liveness factor greater than a given threshold necessary to meet the ASIL system safety metrics is supplemented with redundant memory or error correction mechanisms to reduce the overall vulnerability of the platform to transient faults.

In another embodiment, a platform for autonomous and/or semi-autonomous vehicles may be provided, wherein software dedicated to safety-related functions is executed redundantly on memory having a liveness factor greater than a given threshold necessary to meet the ASIL system safety metrics to reduce the overall vulnerability of the platform to transient faults.

In another embodiment, a platform for autonomous and/or semi-autonomous vehicles may be provided, wherein the memory dedicated to safety-related functions having a liveness factor greater than a given threshold necessary to meet the ASIL system safety metrics is shielded from cosmic rays, alpha particles, or other sources of transient faults.

In another embodiment, a platform for autonomous and/or semi-autonomous vehicles may be provided, wherein the memory dedicated to safety-related functions having a liveness factor greater than a given threshold necessary to meet the ASIL system safety metrics has enhanced shielding from cosmic rays, alpha particles, or other sources of transient faults.

In another embodiment, a platform for autonomous and/or semi-autonomous vehicles may be provided, wherein the memory dedicated to safety-related functions having a liveness factor greater than a given threshold necessary to meet the ASIL system safety metrics has enhanced shielding from cosmic rays, alpha particles, or other sources of transient faults, and the memory dedicated to non-safety-related functions has less shielding.

AI-powered robots may also be designed to ensure additional safety and reliability, which is critical in medical, manufacturing, industrial, and other applications. For example, the invention provides for a platform for AI-powered robots, including in the medical, manufacturing, and industrial fields, wherein the memory dedicated to safety-related functions has a liveness factor less than a given threshold.

The threshold liveness factor may be based on the use of the AI-powered robot; for example, an AI-powered surgical robot will have a liveness factor threshold that ensures no fault occurs during the surgical procedure. An additional or separate factor of safety (S.F.) may also be used to ascertain a threshold that will ensure that the system margin of safety is adequate. However, the liveness factor threshold for an AI-powered robot used for a home vacuuming robot may have a higher liveness factor threshold. Similarly, an AI-powered robot used for industrial or factory applications requiring additional safety (such as large assembly lines) may have lower liveness factor thresholds, determined to ensure no failures during critical operation.

In another embodiment, a platform for AI-powered robots may be provided, including in the medical, manufacturing, and industrial fields, wherein memory dedicated to safety-related functions having a liveness factor greater than a given threshold is supplemented with redundant memory or error correction mechanisms to reduce the overall vulnerability of the platform to transient faults.

In another embodiment, a platform for AI-powered robots may be provided, including in the medical, manufacturing, and industrial fields, wherein software dedicated to safety-related functions is executed redundantly on memory having a liveness factor greater than a given threshold to reduce the overall vulnerability of the platform to transient faults.

In another embodiment, a platform for AI-powered robots may be provided, including in the medical, manufacturing, and industrial fields, wherein the memory dedicated to safety-related functions having a liveness factor greater than a given threshold is shielded from cosmic rays, alpha particles, or other sources of transient faults.

In another embodiment, a platform for AI-powered robots may be provided, including in the medical, manufacturing, and industrial fields, wherein the memory dedicated to safety-related functions having a liveness factor greater than a given threshold has enhanced shielding from cosmic rays, alpha particles, or other sources of transient faults.

In another embodiment, a platform for AI-powered robots may be provided, including in the medical, manufacturing, and industrial fields, wherein the memory dedicated to safety-related functions having a liveness factor greater than a given threshold has enhanced shielding from cosmic rays, alpha particles, or other sources of transient faults, and the memory dedicated to non-safety-related functions has less shielding.

AI-powered drones may also be designed to ensure additional safety and reliability, which is critical in military as well as in civilian applications such as in automated package delivery. For example, the invention provides for a platform for AI-powered drones, including in the military and civilian fields, wherein the memory dedicated to safety-related functions has a liveness factor less than a given threshold.

The threshold liveness factor may be based on the use of the AI-powered drone; for example, an AI-powered package delivery drone will have a liveness factor threshold that ensures safe delivery of a package to a residence. An additional or separate factor of safety (S.F.) may be used to ascertain a threshold that will ensure that the system margin of safety is adequate. Alternatively, the liveness factor threshold for an AI-powered drone used for surveying areas that is unpopulated with people may have a higher liveness factor threshold.

In another embodiment, a platform for AI-powered drones may be provided, including in the military and civilian fields, wherein memory dedicated to safety-related functions having a liveness factor greater than a given threshold is supplemented with redundant memory or error correction mechanisms to reduce the overall vulnerability of the platform to transient faults.

In another embodiment, a platform for AI-powered drones may be provided, including in the military and civilian fields, wherein software dedicated to safety-related functions is executed redundantly on memory having a liveness factor greater than a given threshold to reduce the overall vulnerability of the platform to transient faults.

In another embodiment, a platform for AI-powered drones may be provided, including in the military and civilian fields, wherein the memory dedicated to safety-related functions having a liveness factor greater than a given threshold is shielded from cosmic rays, alpha particles, or other sources of transient faults.

In another embodiment, a platform for AI-powered drones may be provided, including in the military and civilian fields, wherein the memory dedicated to safety-related functions having a liveness factor greater than a given threshold has enhanced shielding from cosmic rays, alpha particles, or other sources of transient faults.

In another embodiment, a platform for AI-powered drones may be provided, including in the military and civilian fields, wherein the memory dedicated to safety-related functions having a liveness factor greater than a given threshold has enhanced shielding from cosmic rays, alpha particles, or other sources of transient faults, and the memory dedicated to non-safety-related functions has less shielding.

Augmentation of Liveness Factor with Read-to-Write Ratio Metric

As an option, the first liveness factor may be augmented using additional data recorded during the simulation including specifically a read-to-write ratio metric. For this option, during the simulation and for each of the entries, a count is recorded of a number of reads of the data from the corresponding entry within each residency period for the corresponding entry. The count may be recorded in the counter set for the entry, in one embodiment, or in another embodiment may be recorded in an additional counter set for the entry. Thus, for example, in FIG. 1B, for the residency period $t_{r1}$ in entry $W_1$, the count would be 3, and for the second residency period $t_{r4}$ in entry $W_4$, the count would be 1.

An average read-to-write ratio for the memory across the plurality of entries is then calculated, based on the count of the number of reads recorded within each residency period. Equation 2 below shows one mathematical equation that can be used to determine the average read-to-write ratio for the memory, as described above.

$$AvRatio_{rw} = \frac{\sum_{i=0}^{N-1}\sum_{j=0}^{W(i)} Ratio_{rw}(i, j)}{N \times \sum_{i=0}^{N-1} W(i)} \quad \text{Equation 2}$$

Where:
t(i,j) is the liveness interval for location i associated with $j_{th}$ write [for example, in FIG. 1B $t_{r1}$=t(1,1) and $t_{r4}$=t(4,2)],
where W(i) is the number of writes in location i, and
the read-to-write ratio, $Ratio_{rw}(i,j)$, is the number of reads in the residency period.

This average read-to-write ratio may represent a second liveness factor for the memory that is separate from the first liveness factor and that is an indicator of the accuracy of the first liveness factor. In general, the first liveness factor gives an upper bound on the probability of vulnerability of a corrupt bit impacting the output results of a computation. A high value of the second liveness factor indicates that there are on average more reads per write in the simulation window and the first liveness factor moves closer to an actual vulnerability probability.

Determining Diagnostic Coverage of Memory by Simulation

In some cases, memory faults can be diagnosed by redundant execution. Fault injection simulations may implement two successive executions using the same memory with the results being compared at the end of the second execution to establish correctness. Differences in the final results are considered to be caused by a fault occurring within the memory. Fault coverage for a memory can be evaluated using this methodology but can be extremely time consuming as faults must be injected into every location of the memory and for every memory for which coverage is required.

Faults occurring in memories operating within the scope of redundant execution will be fully covered by the redundant execution diagnostic if there is no state within the memory persisting across both redundant executions (runs). This fact can be established using a methodology similar to liveness measurement. Memory entries not re-initialized before the second execution run, will potentially cause error propagation between the two execution runs. In particular, if the first access made to an entry during the second execution run is a read operation, then in this case the entry has not been re-initialized (i.e. written) with new data and the read operation will instead retrieve data from the end of the first execution run which may be erroneous. Thus, the computation performed by the second execution may operate on the same erroneous data across the two runs, which can cause errors to be missed.

The embodiments described below integrate an analysis of the persistent state between the two execution runs.

Figure 2A:
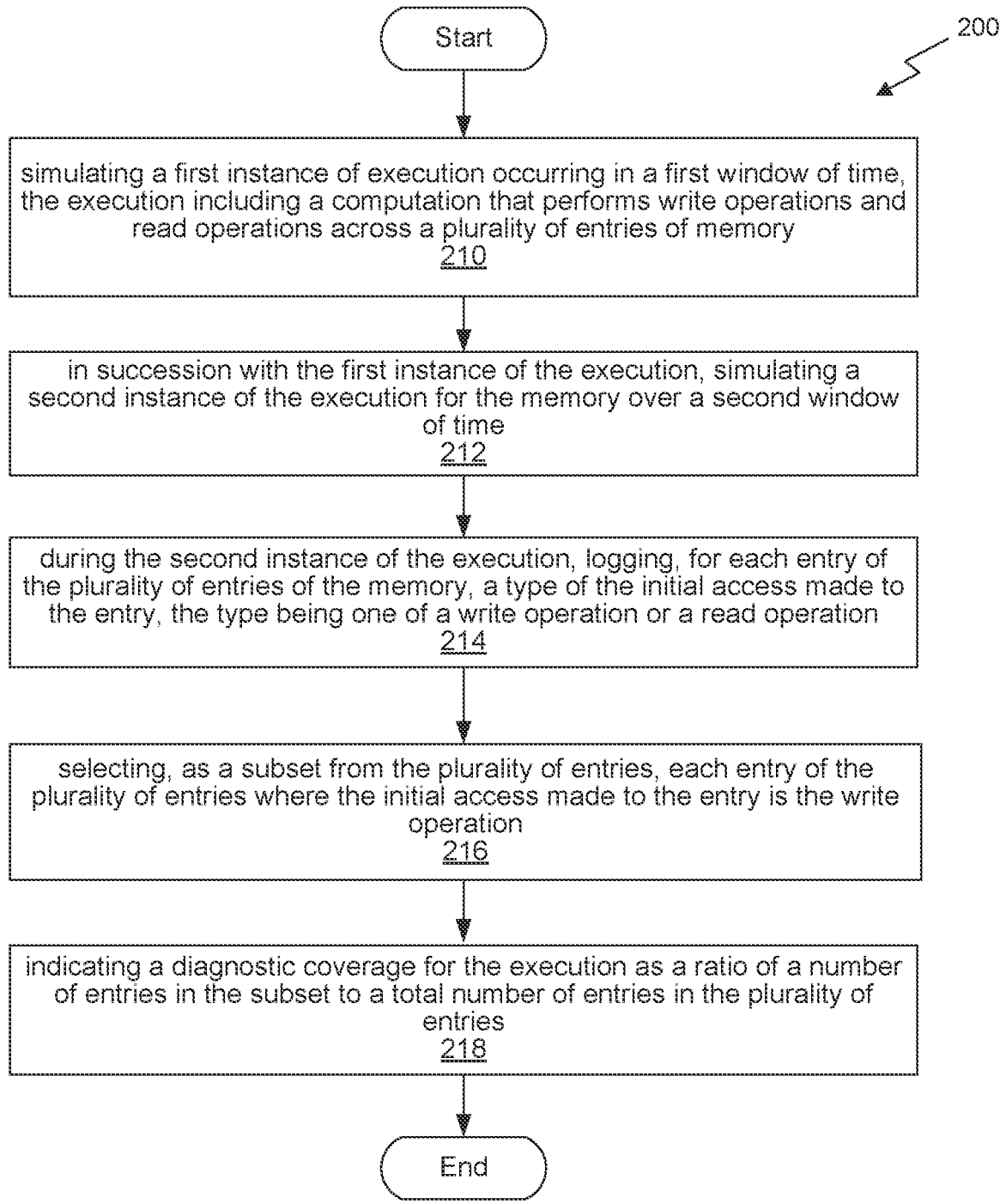
FIG. 2A illustrates a flowchart of a method for determining a diagnostic coverage for memory using redundant execution, in accordance with an embodiment.

FIG. 2A illustrates a flowchart of a method 200 for determining a diagnostic coverage for memory using redundant execution, in accordance with an embodiment. The method 200 may or may not be carried out in combination with the method 100 of FIG. 1A. However, the aforementioned definitions may apply to the description below.

Additionally, it should be noted that the method 200 may be carried out by a processing unit, and may also be performed by a program, custom circuitry, or by a combination of custom circuitry and a program. For example, the method 200 may be executed by a GPU, CPU, or any processor capable of determining a diagnostic coverage for memory using redundant execution. Furthermore, persons of ordinary skill in the art will understand that any system that performs the method 200 is within the scope and spirit of embodiments of the present invention.

As shown in operation 210, a first instance of execution occurring in a first window of time is simulated, including a computation that performs write operations and read operations across a plurality of entries of memory. Of course, when referencing "a" computation, it should be noted that this may include one or more computations by which write operations and read operations are performed on the entries of the memory. In one optional embodiment, the simulation described herein with reference to FIG. 2A may be the same simulation described above with reference to FIG. 1A for using liveness as a factor to evaluate memory vulnerability to soft errors.

Additionally, as shown in operation 212, in succession with the first instance of the execution, a second instance of the execution is simulated for the memory over a second window of time. Accordingly, the same execution performed in operation 210 is repeated in operation 212. Furthermore, the execution in operation 212 is performed in succession with the execution performed in operation 210, such that the execution performed in operation 212 operates on a state of the data in the memory existing at the completion of the execution performed in operation 210. For example, the execution performed in operation 212 may be performed immediately in time after completion of the execution performed in operation 210.

As shown in operation 214, during the second instance of the execution, for each entry of the plurality of entries of the memory, a type of the initial access made to the entry is logged, where the type is one of a write operation or a read operation. In other words, a type of the very first access made to each entry during the second instance of the execution is logged (e.g. recorded, etc.). This initial access and the type thereof may be identified by monitoring the operations performed on the entries of the memory.

Further, in operation 216, for each entry of the plurality of entries where the initial access made to the entry is the write operation, the entry is selected to form a subset from the plurality of entries. Accordingly, the subset will only include entries where the initial access made during the second instance of the execution was a write operation.

Moreover, in operation 218, a diagnostic coverage for the execution is indicated as a ratio of a number of entries in the subset to a total number of entries in the plurality of entries of the memory. The diagnostic coverage may be output (e.g. for display, to another process, etc.).

Figure 2B:
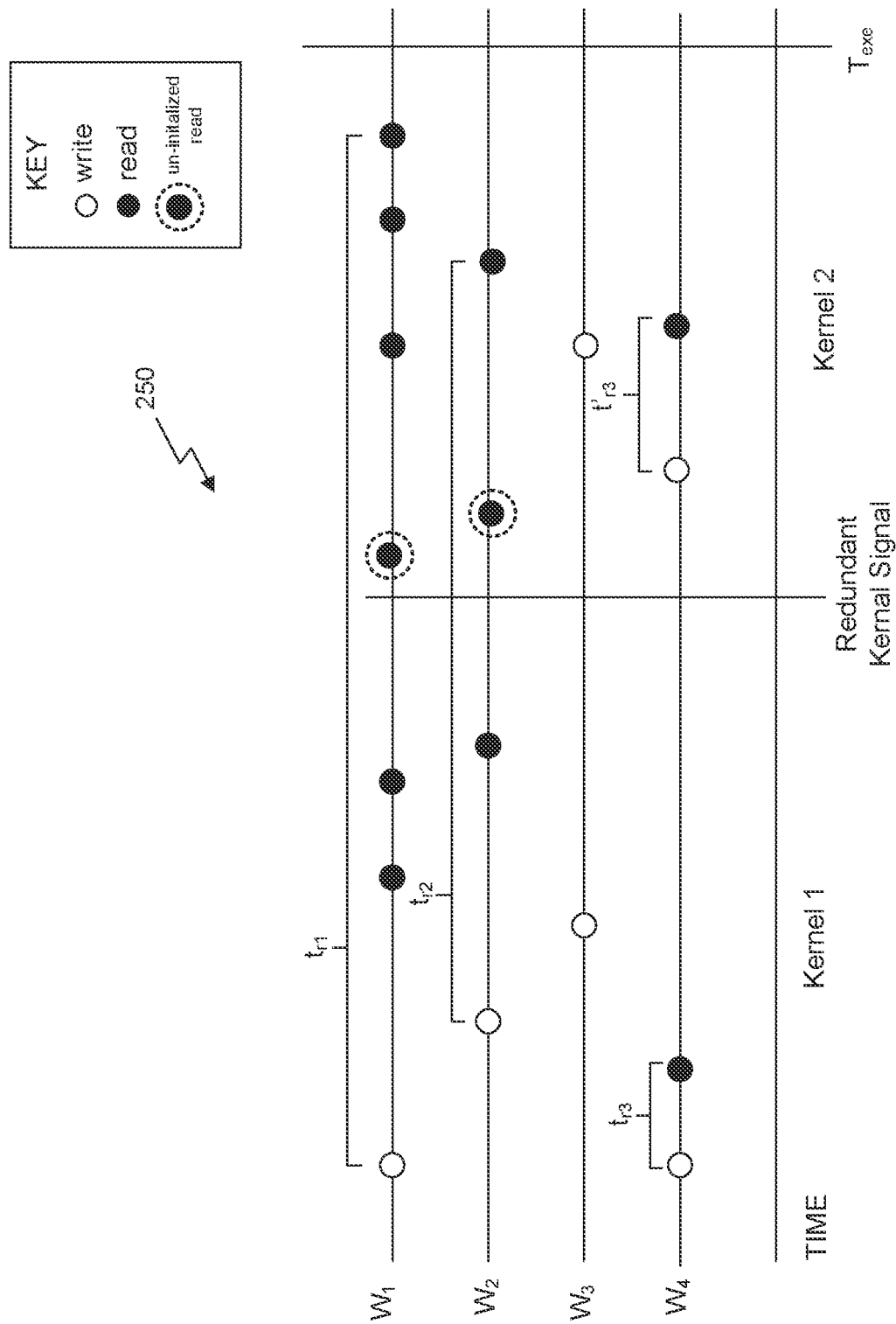
FIG. 2B illustrates a timing diagram for the redundant execution in FIG. 2A, in accordance with an embodiment.

FIG. 2B illustrates a timing diagram 250 for the redundant execution in FIG. 2A, in accordance with an embodiment. As shown, the memory includes four entries (words) $W_1$-$W_4$. A first instance of the execution on the memory is simulated (shown as Kernel 1), during which data is written to, and read from, the entries as shown. A second instance of the execution on the memory is simulated (shown as Kernel 2) in succession with the first instance of the execution (i.e. at the "Redundant Kernel Signal" as shown). However, between Kernel 1 and Kernel 2, the memory entries are not necessarily re-initialized, which may result in the executions being performed on erroneous data across a single one of the entries or the same erroneous data being consumed across both redundant executions.

To account for this potential cause for error, a type of the first access made to each entry during Kernel 2 is logged. Taking the example in FIG. 2B, the initial access made to $W_3$ and $W_4$ are write operations, which means that these entries have been re-initialized at the start of Kernel 2. However, the initial access made to $W_1$ and $W_2$ are read operations, which means that these entries have not been re-initialized at the start of Kernel 2. The diagnostic coverage for the memory is thus the ratio of the 2 re-initialized entries ($W_3$ and $W_4$) to the 4 total entries in the memory ($W_1$-$W_4$).

Parallel Processing Architecture

Figure 3:
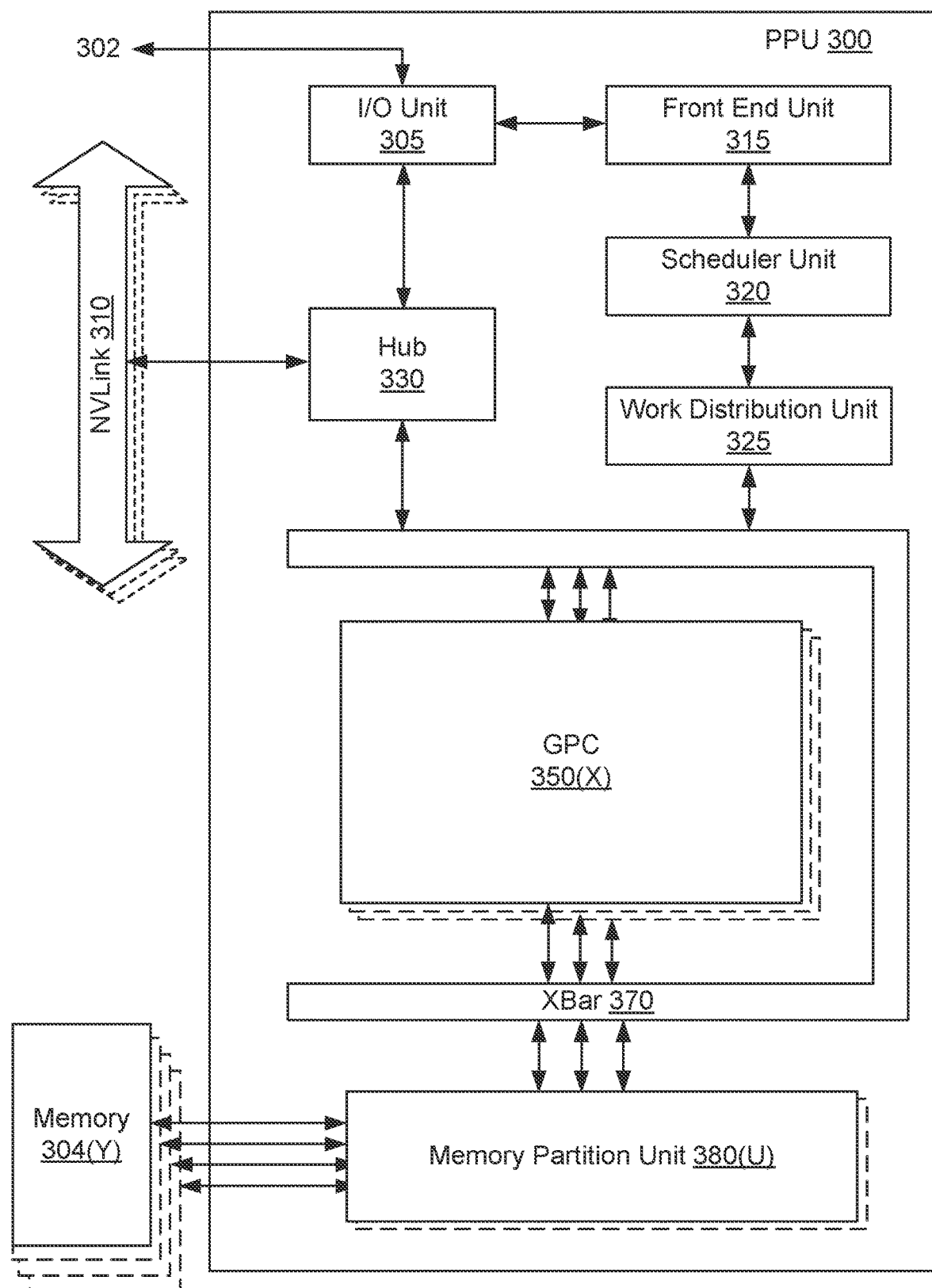
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (i.e., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (i.e., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (i.e., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the partition units 380, which implement a memory interface for reading and writing data to/from the memory 304. The results can be transmitted to another PPU 304 or CPU via the NVLink 310. In an embodiment, the PPU 300 includes a number U of partition units 380 that is equal to the number of separate and distinct memory devices 304 coupled to the PPU 300. A partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (i.e., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
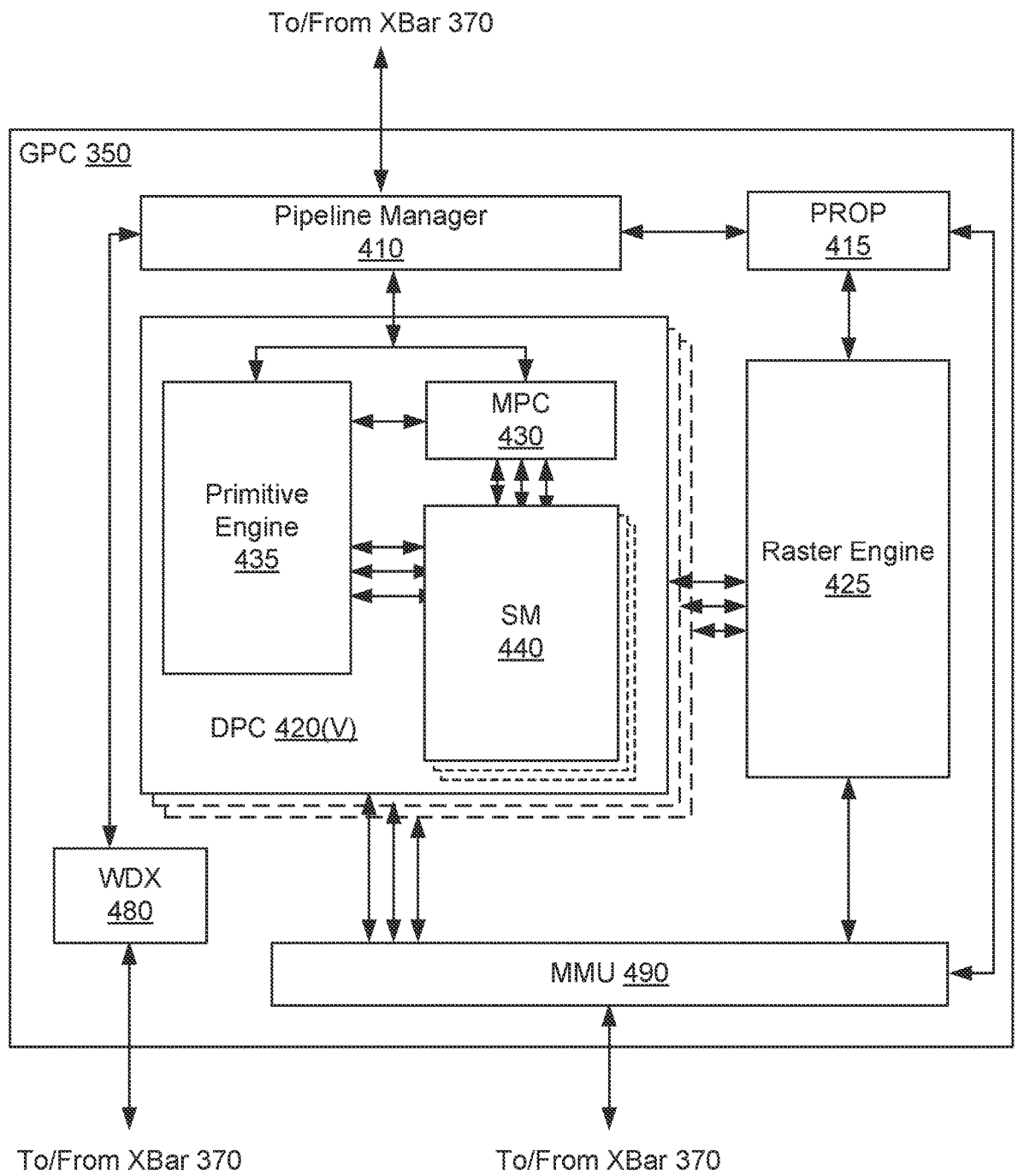
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
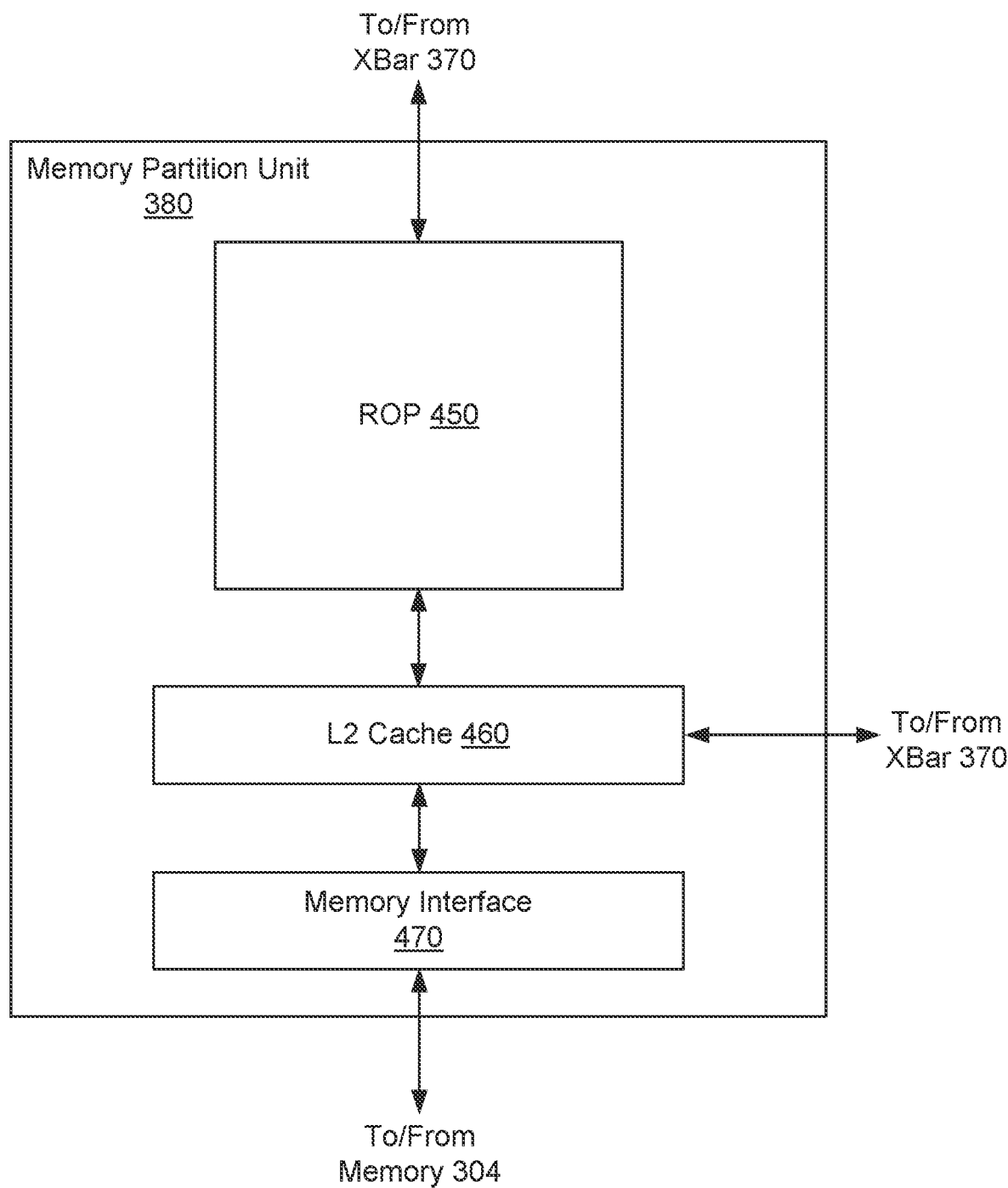
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (i.e., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates U memory interfaces 470, one memory interface 470 per pair of partition units 380, where each pair of partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (i.e., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
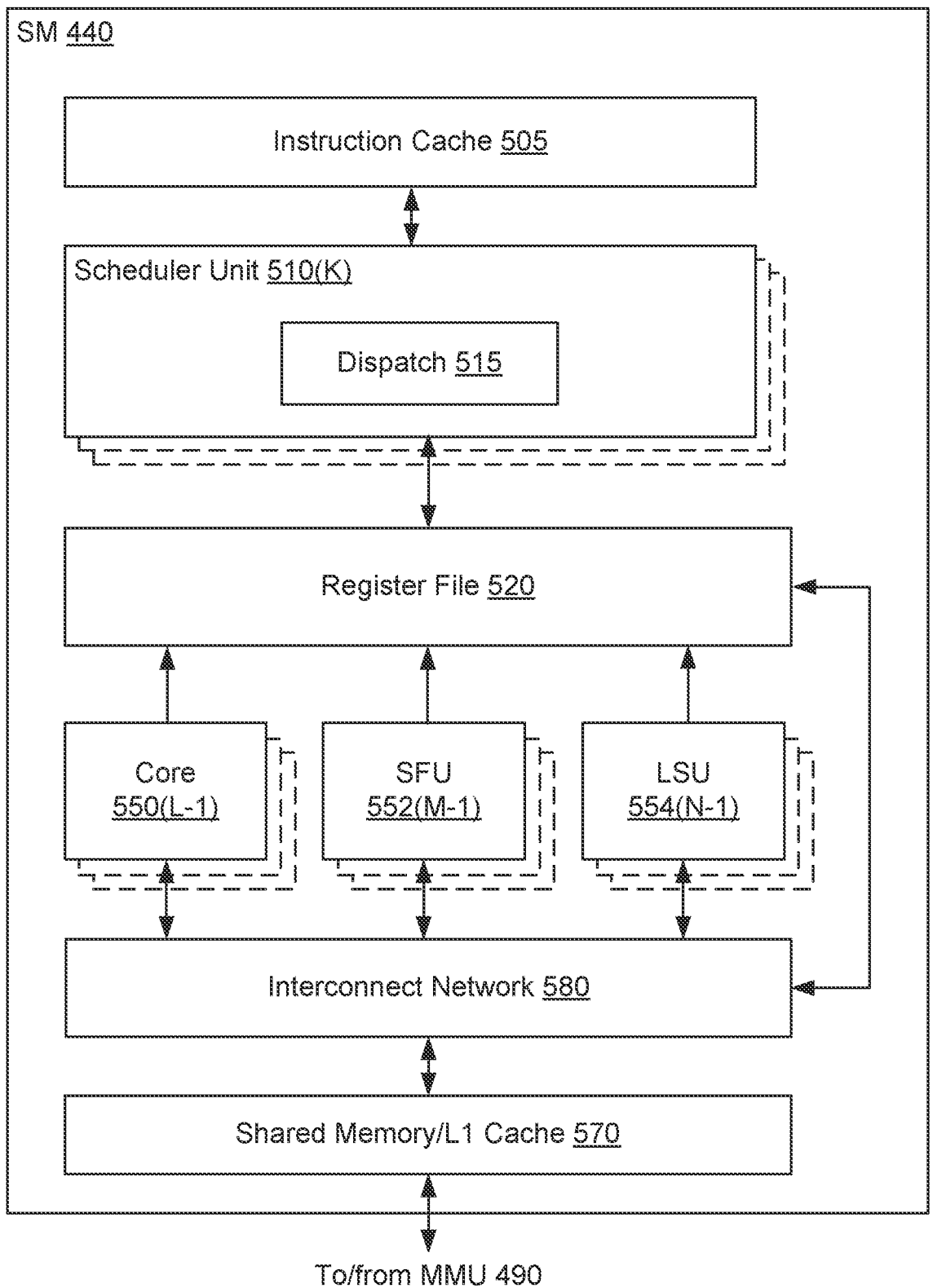
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (i.e., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (i.e., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (i.e., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation $D=A \times B+C$, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (i.e., texture maps of varying levels of detail). In an embodiment, each SM 340 includes two texture units.

Each SM 440 also comprises N LSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
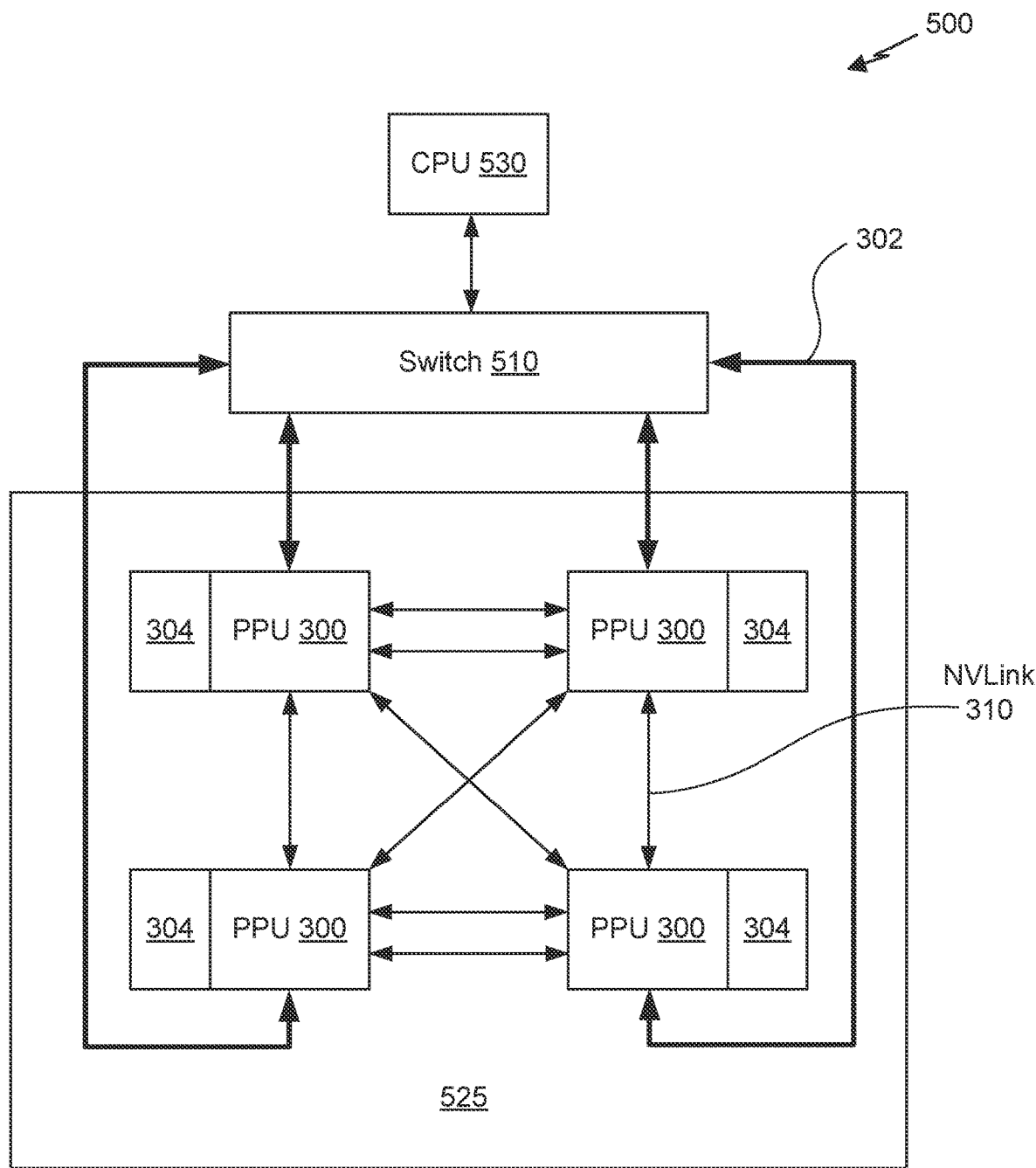
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 100 shown in FIG. 1A and/or the method 200 shown in FIG. 2A. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
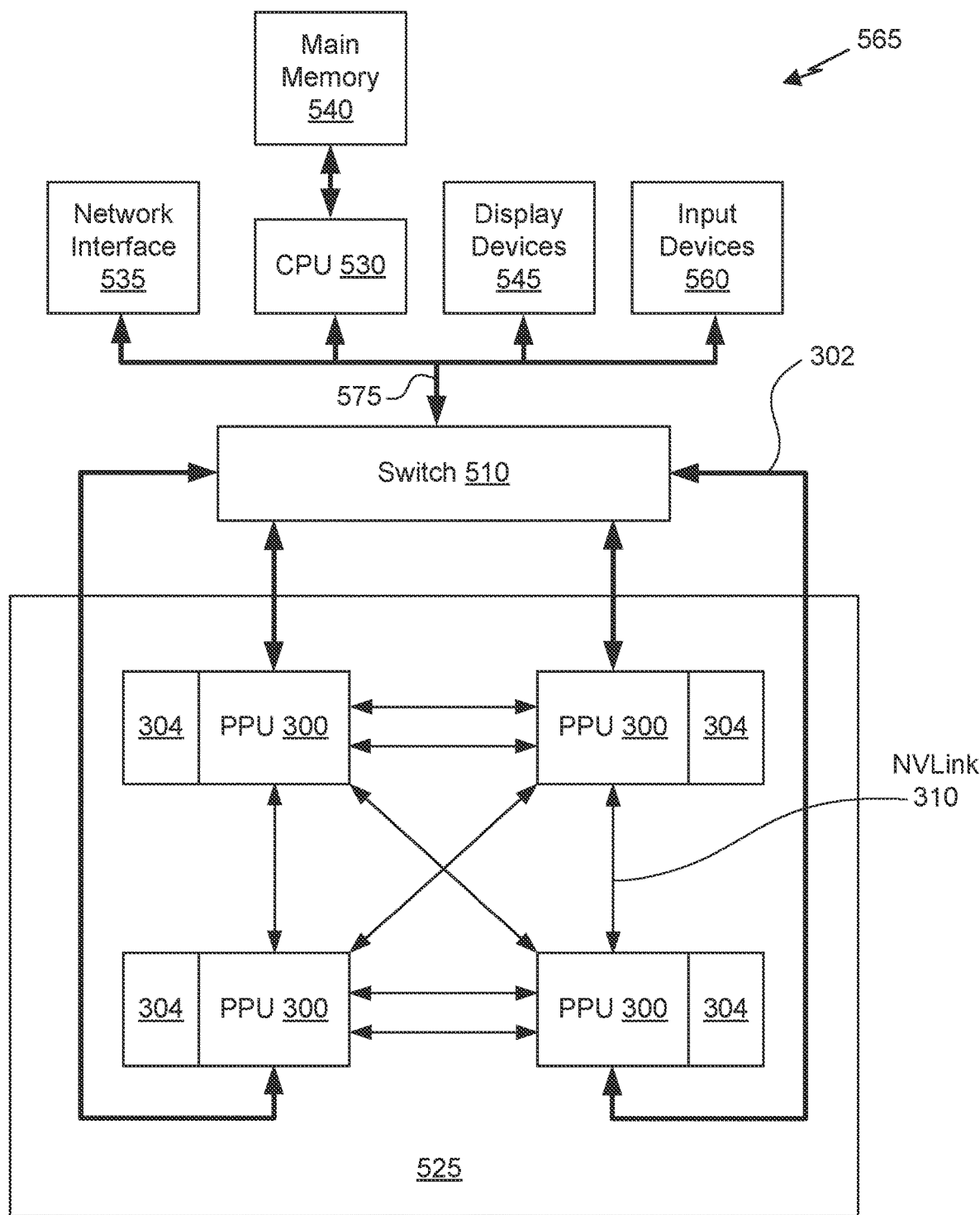
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 100 shown in FIG. 1A and/or the method 200 shown in FIG. 2A.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, i.e. a conventional CRT (cathode ray tube), LCD (liquid crystal display), LED (light emitting diode), plasma display or the like. User input may be received from the input devices 560, e.g., keyboard, mouse, touchpad, microphone, and the like. Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Graphics Processing Pipeline

In an embodiment, the PPU 300 comprises a graphics processing unit (GPU). The PPU 300 is configured to receive commands that specify shader programs for processing graphics data. Graphics data may be defined as a set of primitives such as points, lines, triangles, quads, triangle strips, and the like. Typically, a primitive includes data that specifies a number of vertices for the primitive (e.g., in a model-space coordinate system) as well as attributes associated with each vertex of the primitive. The PPU 300 can be configured to process the graphics primitives to generate a frame buffer (i.e., pixel data for each of the pixels of the display).

An application writes model data for a scene (i.e., a collection of vertices and attributes) to a memory such as a system memory or memory 304. The model data defines each of the objects that may be visible on a display. The application then makes an API call to the driver kernel that requests the model data to be rendered and displayed. The driver kernel reads the model data and writes commands to the one or more streams to perform operations to process the model data. The commands may reference different shader programs to be implemented on the SMs 440 of the PPU 300 including one or more of a vertex shader, hull shader, domain shader, geometry shader, and a pixel shader. For example, one or more of the SMs 440 may be configured to execute a vertex shader program that processes a number of vertices defined by the model data. In an embodiment, the different SMs 440 may be configured to execute different shader programs concurrently. For example, a first subset of SMs 440 may be configured to execute a vertex shader program while a second subset of SMs 440 may be configured to execute a pixel shader program. The first subset of SMs 440 processes vertex data to produce processed vertex data and writes the processed vertex data to the L2 cache 460 and/or the memory 304. After the processed vertex data is rasterized (i.e., transformed from three-dimensional data into two-dimensional data in screen space) to produce fragment data, the second subset of SMs 440 executes a pixel shader to produce processed fragment data, which is then blended with other processed fragment data and written to the frame buffer in memory 304. The vertex shader program and pixel shader program may execute concurrently, processing different data from the same scene in a pipelined fashion until all of the model data for the scene has been rendered to the frame buffer. Then, the contents of the frame buffer are transmitted to a display controller for display on a display device.

Figure 6:
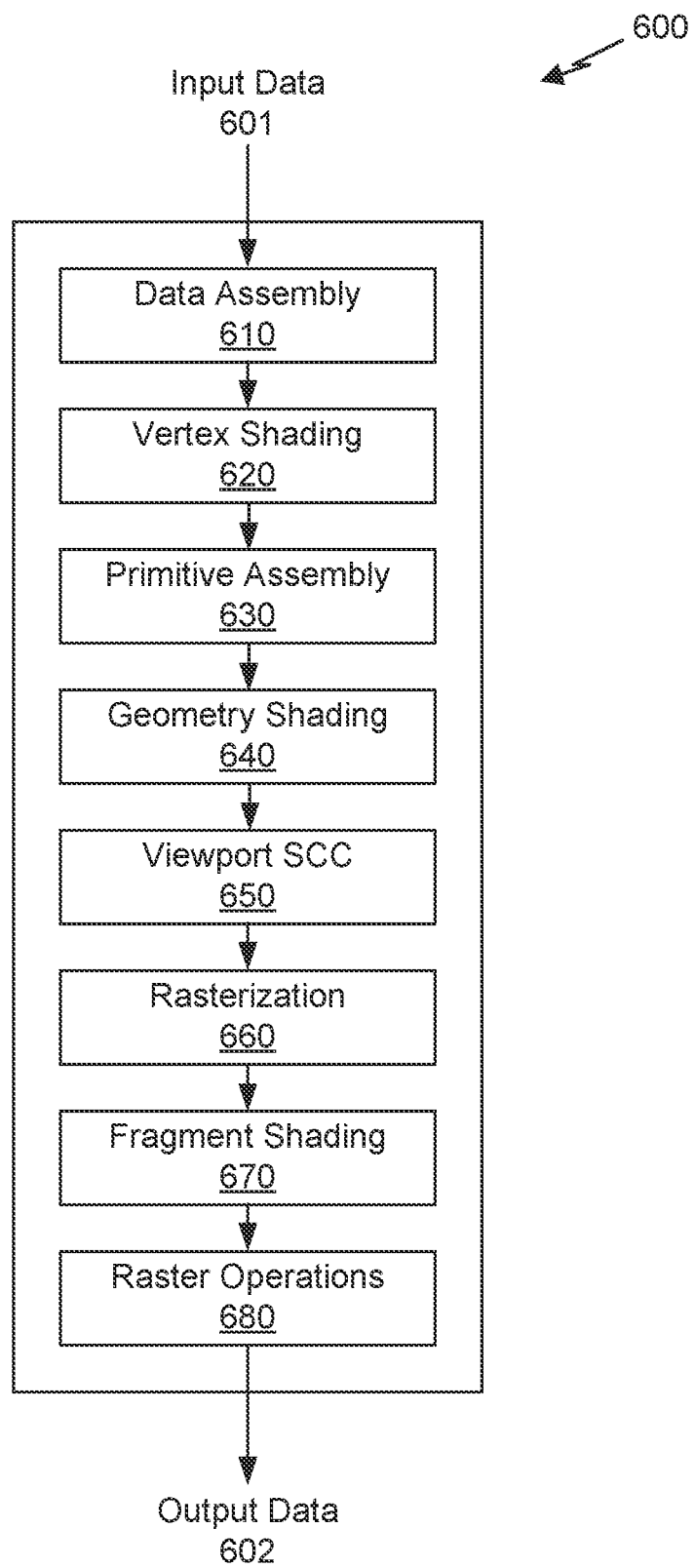
FIG. 6 is a conceptual diagram of a graphics processing pipeline implemented by the PPU of FIG. 3, in accordance with an embodiment.

FIG. 6 is a conceptual diagram of a graphics processing pipeline 600 implemented by the PPU 300 of FIG. 3, in accordance with an embodiment. The graphics processing pipeline 600 is an abstract flow diagram of the processing steps implemented to generate 2D computer-generated images from 3D geometry data. As is well-known, pipeline architectures may perform long latency operations more efficiently by splitting up the operation into a plurality of stages, where the output of each stage is coupled to the input of the next successive stage. Thus, the graphics processing pipeline 600 receives input data 601 that is transmitted from one stage to the next stage of the graphics processing pipeline 600 to generate output data 602. In an embodiment, the graphics processing pipeline 600 may represent a graphics processing pipeline defined by the OpenGL® API. As an option, the graphics processing pipeline 600 may be implemented in the context of the functionality and architecture of the previous Figures and/or any subsequent Figure(s).

As shown in FIG. 6, the graphics processing pipeline 600 comprises a pipeline architecture that includes a number of stages. The stages include, but are not limited to, a data assembly stage 610, a vertex shading stage 620, a primitive assembly stage 630, a geometry shading stage 640, a viewport scale, cull, and clip (VSCC) stage 650, a rasterization stage 660, a fragment shading stage 670, and a raster operations stage 680. In an embodiment, the input data 601 comprises commands that configure the processing units to implement the stages of the graphics processing pipeline 600 and geometric primitives (e.g., points, lines, triangles, quads, triangle strips or fans, etc.) to be processed by the stages. The output data 602 may comprise pixel data (i.e., color data) that is copied into a frame buffer or other type of surface data structure in a memory.

The data assembly stage 610 receives the input data 601 that specifies vertex data for high-order surfaces, primitives, or the like. The data assembly stage 610 collects the vertex data in a temporary storage or queue, such as by receiving a command from the host processor that includes a pointer to a buffer in memory and reading the vertex data from the buffer. The vertex data is then transmitted to the vertex shading stage 620 for processing.

The vertex shading stage 620 processes vertex data by performing a set of operations (i.e., a vertex shader or a program) once for each of the vertices. Vertices may be, e.g., specified as a 4-coordinate vector (i.e., <x, y, z, w>) associated with one or more vertex attributes (e.g., color, texture coordinates, surface normal, etc.). The vertex shading stage 620 may manipulate individual vertex attributes such as position, color, texture coordinates, and the like. In other words, the vertex shading stage 620 performs operations on the vertex coordinates or other vertex attributes associated with a vertex. Such operations commonly including lighting operations (i.e., modifying color attributes for a vertex) and transformation operations (i.e., modifying the coordinate space for a vertex). For example, vertices may be specified using coordinates in an object-coordinate space, which are transformed by multiplying the coordinates by a matrix that translates the coordinates from the object-coordinate space into a world space or a normalized-device-coordinate (NCD) space. The vertex shading stage 620 generates transformed vertex data that is transmitted to the primitive assembly stage 630.

The primitive assembly stage 630 collects vertices output by the vertex shading stage 620 and groups the vertices into geometric primitives for processing by the geometry shading stage 640. For example, the primitive assembly stage 630 may be configured to group every three consecutive vertices as a geometric primitive (i.e., a triangle) for transmission to the geometry shading stage 640. In some embodiments, specific vertices may be reused for consecutive geometric primitives (e.g., two consecutive triangles in a triangle strip may share two vertices). The primitive assembly stage 630 transmits geometric primitives (i.e., a collection of associated vertices) to the geometry shading stage 640.

The geometry shading stage 640 processes geometric primitives by performing a set of operations (i.e., a geometry shader or program) on the geometric primitives. Tessellation operations may generate one or more geometric primitives from each geometric primitive. In other words, the geometry shading stage 640 may subdivide each geometric primitive into a finer mesh of two or more geometric primitives for processing by the rest of the graphics processing pipeline 600. The geometry shading stage 640 transmits geometric primitives to the viewport SCC stage 650.

In an embodiment, the graphics processing pipeline 600 may operate within a streaming multiprocessor and the vertex shading stage 620, the primitive assembly stage 630, the geometry shading stage 640, the fragment shading stage 670, and/or hardware/software associated therewith, may sequentially perform processing operations. Once the sequential processing operations are complete, in an embodiment, the viewport SCC stage 650 may utilize the data. In an embodiment, primitive data processed by one or more of the stages in the graphics processing pipeline 600 may be written to a cache (e.g. L1 cache, a vertex cache, etc.). In this case, in an embodiment, the viewport SCC stage 650 may access the data in the cache. In an embodiment, the viewport SCC stage 650 and the rasterization stage 660 are implemented as fixed function circuitry.

The viewport SCC stage 650 performs viewport scaling, culling, and clipping of the geometric primitives. Each surface being rendered to is associated with an abstract camera position. The camera position represents a location of a viewer looking at the scene and defines a viewing frustum that encloses the objects of the scene. The viewing frustum may include a viewing plane, a rear plane, and four clipping planes. Any geometric primitive entirely outside of the viewing frustum may be culled (i.e., discarded) because the geometric primitive will not contribute to the final rendered scene. Any geometric primitive that is partially inside the viewing frustum and partially outside the viewing frustum may be clipped (i.e., transformed into a new geometric primitive that is enclosed within the viewing frustum. Furthermore, geometric primitives may each be scaled based on a depth of the viewing frustum. All potentially visible geometric primitives are then transmitted to the rasterization stage 660.

The rasterization stage 660 converts the 3D geometric primitives into 2D fragments (e.g. capable of being utilized for display, etc.). The rasterization stage 660 may be configured to utilize the vertices of the geometric primitives to setup a set of plane equations from which various attributes can be interpolated. The rasterization stage 660 may also compute a coverage mask for a plurality of pixels that indicates whether one or more sample locations for the pixel intercept the geometric primitive. In an embodiment, z-testing may also be performed to determine if the geometric primitive is occluded by other geometric primitives that have already been rasterized. The rasterization stage 660 generates fragment data (i.e., interpolated vertex attributes associated with a particular sample location for each covered pixel) that are transmitted to the fragment shading stage 670.

The fragment shading stage 670 processes fragment data by performing a set of operations (i.e., a fragment shader or a program) on each of the fragments. The fragment shading stage 670 may generate pixel data (i.e., color values) for the fragment such as by performing lighting operations or sampling texture maps using interpolated texture coordinates for the fragment. The fragment shading stage 670 generates pixel data that is transmitted to the raster operations stage 680.

The raster operations stage 680 may perform various operations on the pixel data such as performing alpha tests, stencil tests, and blending the pixel data with other pixel data corresponding to other fragments associated with the pixel. When the raster operations stage 680 has finished processing the pixel data (i.e., the output data 602), the pixel data may be written to a render target such as a frame buffer, a color buffer, or the like.

It will be appreciated that one or more additional stages may be included in the graphics processing pipeline 600 in addition to or in lieu of one or more of the stages described above. Various implementations of the abstract graphics processing pipeline may implement different stages. Furthermore, one or more of the stages described above may be excluded from the graphics processing pipeline in some embodiments (such as the geometry shading stage 640).

Other types of graphics processing pipelines are contemplated as being within the scope of the present disclosure. Furthermore, any of the stages of the graphics processing pipeline 600 may be implemented by one or more dedicated hardware units within a graphics processor such as PPU 300. Other stages of the graphics processing pipeline 600 may be implemented by programmable hardware units such as the SM 440 of the PPU 300.

The graphics processing pipeline 600 may be implemented via an application executed by a host processor, such as a CPU. In an embodiment, a device driver may implement an application programming interface (API) that defines various functions that can be utilized by an application in order to generate graphical data for display. The device driver is a software program that includes a plurality of instructions that control the operation of the PPU 300. The API provides an abstraction for a programmer that lets a programmer utilize specialized graphics hardware, such as the PPU 300, to generate the graphical data without requiring the programmer to utilize the specific instruction set for the PPU 300. The application may include an API call that is routed to the device driver for the PPU 300. The device driver interprets the API call and performs various operations to respond to the API call. In some instances, the device driver may perform operations by executing instructions on the CPU. In other instances, the device driver may perform operations, at least in part, by launching operations on the PPU 300 utilizing an input/output interface between the CPU and the PPU 300. In an embodiment, the device driver is configured to implement the graphics processing pipeline 600 utilizing the hardware of the PPU 300.

Various programs may be executed within the PPU 300 in order to implement the various stages of the graphics processing pipeline 600. For example, the device driver may launch a kernel on the PPU 300 to perform the vertex shading stage 620 on one SM 440 (or multiple SMs 440). The device driver (or the initial kernel executed by the PPU 400) may also launch other kernels on the PPU 400 to perform other stages of the graphics processing pipeline 600, such as the geometry shading stage 640 and the fragment shading stage 670. In addition, some of the stages of the graphics processing pipeline 600 may be implemented on fixed unit hardware such as a rasterizer or a data assembler implemented within the PPU 400. It will be appreciated that results from one kernel may be processed by one or more intervening fixed function hardware units before being processed by a subsequent kernel on an SM 440.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected perceptrons (e.g., nodes) that can be trained with enormous amounts of input data to quickly solve complex problems with high accuracy. In one example, a first layer of the DLL model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A method, comprising:
executing a simulation for a memory comprising a plurality of portions over a window of time;
during the simulation, determine each residency period for the corresponding portion, wherein the residency period is determined according to:
a first time that the corresponding portion is written with data, and
a second time of a last read of the data from the corresponding portion; and
after completion of the simulation, computing a first liveness factor for the memory based on the residency periods, the first liveness factor representing a vulnerability of the memory to soft errors.

2. The method of claim 1, further comprising, in response to the first liveness factor, initiating remedial action to reduce the vulnerability of the memory to soft errors.

3. The method of claim 1, further comprising,
determining that the first liveness factor exceeds a threshold value; and
in response to determining that the first liveness factor exceeds the threshold value, activating at least one of:
a redundant memory; or
an error correction mechanism.

4. The method of claim 3, wherein the threshold value is associated with a safety metric.

5. The method of claim 1, wherein the simulation is associated with a use of at least one of:
a platform for autonomous and/or semi-autonomous vehicles;
a platform for AI-powered robots; or
a platform for AI-powered drones.

6. The method of claim 1, wherein the first liveness factor is variable and based at least partially on a mode of operation.

7. The method of claim 1, further comprising:
determining a number of reads of the data within each residency period for the corresponding portion; and
calculating a second liveness factor as an average ratio of the number of reads for each residency period across the portions of the plurality of portions.

8. The method of claim 7, wherein the second liveness factor indicates an accuracy of the first liveness factor.

9. The method of claim 1, wherein the memory is random access memory (RAM).

10. The method of claim 1, wherein each portion of the plurality of portions comprises at least one word in the memory.

11. The method of claim 1, wherein the simulation is performed using a register-transfer level (RTL) description of the memory.

12. The method of claim 1, wherein the first time and the second time are recorded as particular clock cycles within the window of time.

13. The method of claim 1, wherein a time period between the first time and the second time represents one residency period for the corresponding portion.

14. The method of claim 1, wherein each portion of the plurality of portions is capable of having more than one residency period.

15. The method of claim 1, wherein computing the first liveness factor for the memory comprises:
calculating a sum of the residency periods for the plurality of portions,
dividing the sum by a multiplication of: a size of the memory and the window of time.

16. A non-transitory computer readable medium storing computer code executable by a processor to perform a method comprising:
executing a simulation for a memory comprising a plurality of portions over a window of time;
during the simulation, determining each residency period for the corresponding portion, wherein the residency period is determined according to:
a first time that the corresponding portion is written with data, and a second time of a last read of the data from the corresponding portion; and after completion of the simulation, computing a first liveness factor for the memory based on the residency periods, the first liveness factor representing a vulnerability of the memory to soft errors.

17. The non-transitory computer readable medium of claim 16, wherein the method further comprises, in response to determining that the first liveness factor exceeds a threshold value, enabling at least one of:

a redundant memory; or an error correction mechanism.

18. A system, comprising:

a memory storing computer code; and a processor in communication with the memory that executes computer code to perform a method comprising:

executing a simulation for a memory comprising a plurality of portions over a window of time;

during the simulation, determining each residency period for the corresponding portion, wherein the residency period is determined according to:

a first time that the corresponding portion is written with data, and a second time of a last read of the data from the corresponding portion; and after completion of the simulation, computing a first liveness factor for the memory based on the residency periods, the first liveness factor representing a vulnerability of the memory to soft errors.

19. The system of claim 18, wherein the method further comprises, in response to the first liveness factor, initiating remedial action to reduce the vulnerability of the memory to soft errors.

20. The system of claim 18, wherein the simulation is associated with a use of at least one of:

a platform for autonomous and/or semi-autonomous vehicles;

a platform for AI-powered robots; or a platform for AI-powered drones.

* * * * *